United States Patent [19]

Yamato

[11] Patent Number: 5,023,781

[45] Date of Patent: Jun. 11, 1991

[54] ELECTRIC CASH REGISTER

[75] Inventor: Masaki Yamato, Kyoto, Japan

[73] Assignee: Omron Tateisi Electronics Co., Kyoto, Japan

[21] Appl. No.: 16,733

[22] Filed: Feb. 20, 1987

[30] Foreign Application Priority Data

Feb. 21, 1986 [JP] Japan .................................. 61-38003

[51] Int. Cl.⁵ ............................................ G06F 15/20
[52] U.S. Cl. ................................................... 364/405
[58] Field of Search ................ 364/405, 406; 235/382, 235/380, 381

[56] References Cited

U.S. PATENT DOCUMENTS

| 4,186,439 | 1/1980 | Shimura et al. | 364/405 |
| 4,220,991 | 9/1980 | Hamano et al. | 364/405 |
| 4,245,311 | 1/1981 | Nakamura | 364/405 |
| 4,358,672 | 11/1982 | Hyatt et al. | 235/382 |

FOREIGN PATENT DOCUMENTS

| 0122244 | 10/1984 | European Pat. Off. . | |
| 0041504 | 3/1980 | Japan | 364/405 |
| 0079363 | 6/1981 | Japan | 364/405 |
| 0178554 | 11/1982 | Japan | 364/405 |

Primary Examiner—Clark A. Jablon
Assistant Examiner—Kim T. Tbui
Attorney, Agent, or Firm—Dickstein, Shapiro & Morin

[57] ABSTRACT

An electronic cash register is provided which an operator can operate by inserting a card therein on which at least an operable period of time for which said register is operable has been recorded. The register can be operated when the present time is within the operable period of time recorded on the card.

7 Claims, 4 Drawing Sheets

FIG. 6
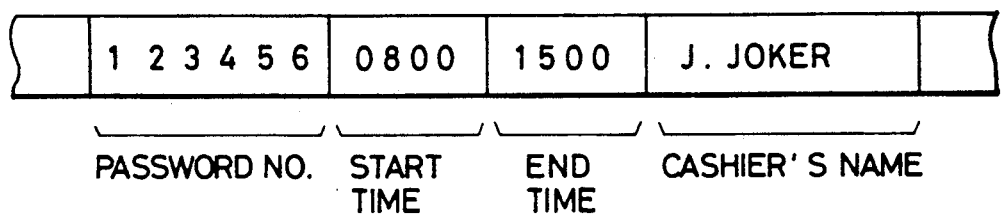
FIG. 7(a)
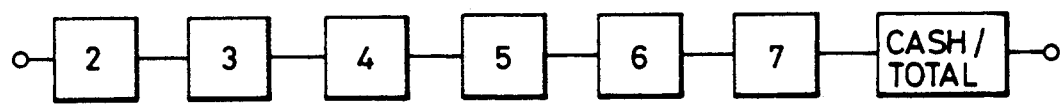
FIG. 7(b)
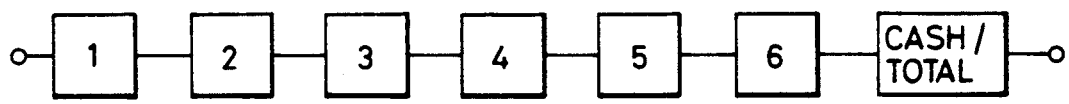
FIG. 8
```
85 / 12 / 23        10 : 50
DEPARTMENT 1         1000
PLU  0001             500
TAX                    50
SUB-TOTAL            1550
CASH                 1550
J. JOKER           #1234
```

ELECTRIC CASH REGISTER

BACKGROUND OF THE INVENTION

1. Field of the Invention

This invention relates to an electronic cash register (hereinafter referred to as "an ECR"), and more particularly to an ECR which is operated by different operators (herein after referred to as "cashiers") for different periods of time.

2. Discussion of the Prior Art

In many countries, in order to clarify the responsibility for operation of an ECR and to strictly control proceeds, it is essential to register and identify a cashier who has the responsibility for the ECR for various periods of time. For this purpose, some conventional ECRs are so designed that they can identify the cashiers who can operate them. Examples of the methods used to identify a cashier are as follows:

(1) A key is handed to a cashier every time the ECR is used, so that the ECR cannot be operated without inserting the key thereinto.

(2) Different keys are given to different cashiers, respectively. The ECR discriminates the configurations of the keys to identify the operating cashiers.

(3) An interlocking key device is used to identify the operating cashiers in which a locked key is released by operating another key which is operated to identify the cashier.

(4) Different codes are assigned to different cashiers, respectively, so that the cashiers can be identified by the codes entered by the cashiers into the ECR.

In identifying a cashier in the conventional ECRs described above, the names of all cashiers operating the ECR, and data on functions to be performed, are stored in the memory in the ECR in advance, and when the key or code of a cashier is entered, the information required for the cashier to operate the ECR is read out according to the key or code thus entered.

The above-described cashier identification methods (1) through (4) have the following disadvantages: The keys or codes given to the cashiers have no information on the respective cashiers. Therefore, it cannot be determined whether or not the person using the key or code is the true cashier to whom the key or code has been given. Accordingly, if the key or code were stolen by someone, there is no effective method of preventing operation of the ECR by an unauthorized person. Furthermore, the above-described methods may cause the problem that, for instance, a cashier operates the ECR during a period of time other than that assigned to him.

SUMMARY OF THE INVENTION

Accordingly, an object of this invention is to eliminate the above-described difficulties accompanying a conventional electronic cash register More specifically, an object of the invention is to provide an electronic cash register in which various data concerning a cashier have been recorded on a card, and the cashier is identified according to the data read from the card and the key operation performed by him.

In the invention, the electronic cash register can be operated by an operator using a card in which at least an operable period of time for which the register is operable has been recorded. The electronic cash register of the invention then comprises reading means for reading card data from the card; time indicating means for indicating the present time; time determining means for determining whether or not the time indicated by the time indicating means is within the operable period of time read by the reading means; and operation control means for permitting the operator to operate the ECR only when the time determining means has determined that the time indicated by the time indicating means is within the operable period of time read by the reading means.

As evident from the above, in an electronic cash register according to this invention, it is determined whether or not the present time provided by the time indicating means is within the predetermined operable period of time read from the card, so that the operator is permitted to operate the ECR only when the present time indicated is within the operable period of time.

Therefore, even if the card is stolen by someone, the chance of dishonestly operating the ECR dishonestly outside the operable period of time is reduced and a greater degree of control of the operation of an ECR by a cashier can be obtained.

BRIEF DESCRIPTION OF THE DRAWINGS

FIG. 6 is an explanatory diagram showing an example of the data format of a cashier card employed in the invention;

FIGS. 7(a) and 7(b) are explanatory diagrams showing examples of a password number entering operation; and, FIG. 8 is an explanatory diagram showing an example of a receipt prepared by the electronic cash register according to the invention.

DETAILED DESCRIPTION OF THE INVENTION

Figure 3:
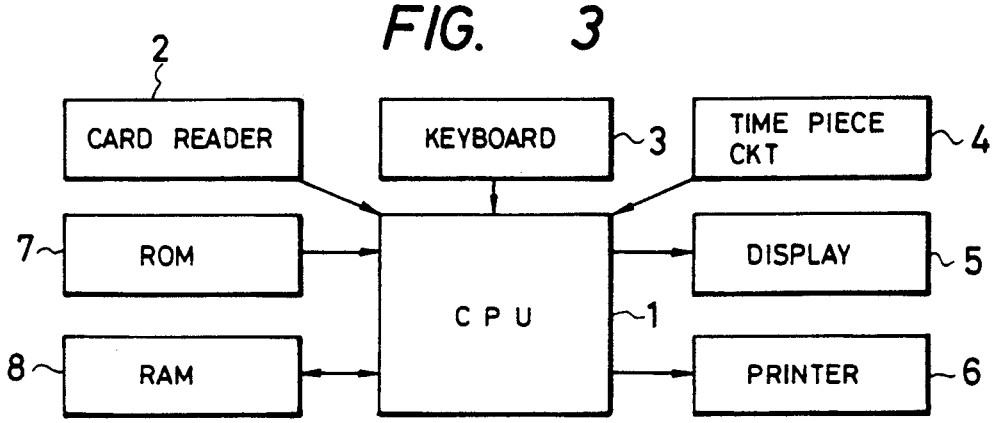
FIG. 3 is a block diagram showing the electrical arrangement of the electronic cash register according to the invention.

FIG. 3 is a block diagram showing the electrical arrangement of an electronic cash register according to this invention.

Figure 4:
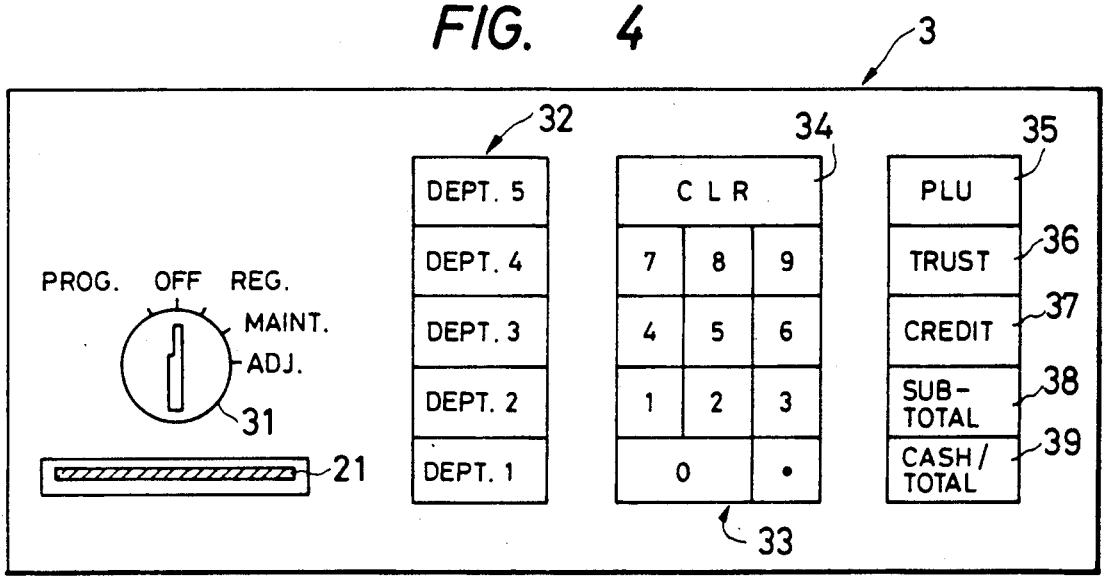
FIG. 4 is an external view of a keyboard shown in FIG. 3.

As shown in FIG. 3, a CPU 1 is connected to a card reader 2, keyboard 3, a time piece circuit 4, a display unit 5, a printer 6, a ROM 7 and a RAM 8. The card reader 2 operates to read card data from a cashier card containing cashier data in a format An example of the format is as shown in FIG. 6. In FIG. 6, the cashier data includes a confidential password number, an operable period of time in the form of a start time and an end time, and a cashier's name. The keyboard 3 is used to enter a confidential password number when the cashier operates the ECR, or enter monetary data during the sale of a commodity, and has a variety of keys as shown in FIG. 4. The time piece circuit 4 measures the present time. The display unit 5 operates to display department codes and PLU (price look-up) codes entered when the sales of commodities are registered, and to display commodity unit prices or a total of the transaction. The printer 6 is used to print and issue a receipt as shown in FIG. 8. The ROM 7 stores operating programs of the CPU 1 prepared according to the flowcharts shown in FIGS. 1 and 2. The RAM 8 has a memory area arranged as shown in FIG. 5.

FIG. 4 depicts an external appearance of the keyboard 3 shown in FIG. 3. As shown in FIG. 4, the keyboard 3 includes a cashier card inserting slot 21 for receiving the cashier card so that it passes therethrough into the card reader 2. A mode change-over switch 31, department keys 32, a ten-key key pad 33, a clear key 34, a PLU key 35, a trust key 36, a credit key 37, a subtotal key 38, and a cash/total key 39 are all provided on the keyboard 3.

The mode change-over switch 31 is operated to select a desired operation mode. The department keys 32 are operated to enter the department codes of commodities. The ten-key key pad 33 is used to enter commodity codes (PLU codes) or numerical data such as the number of commodities. The PLU key 35 is operated to indicate that the numerical data entered immediately before the operation of the PLU key is a PLU code. The cash/total key 39 is operated to indicate the totalization in a sales transaction, and also indicates that the numerical data entered by the cashier in the operation of the ECR is the password number. This action will be described later with reference to FIGS. 7(a) and 7(b).

Figure 5:
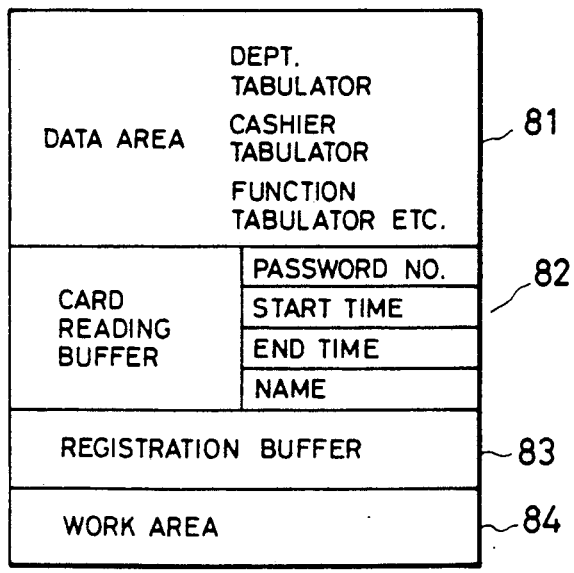
FIG. 5 is an explanatory diagram showing storage areas in a RAM shown in FIG. 3.

FIG. 5 shows a memory area in the RAM 8 of FIG. 3. The memory area includes an ECR data area 81, a card reading buffer 82, a registration buffer 83 and a ward area 84.

The ECR data area 81 stores data provided by department tabulators, a cashier tabulator, function tabulators, etc. The card reading buffer 82 is an area for storing the data read out of the cashier card; that is, the confidential pasward number, start time, end time and cashier's name are stored in this area. The registration buffer 83 is an area for storing the data entered by the ten-key key pad 33. The work area 84 is an area for temporarily storing various operation data.

FIG. 6 shows an example of the data format of the cashier card employed in one embodiment of the invention.

As shown therein, a confidential password number, start time, end time and cashier's name are recorded in the cashier card. The password number is a code for identifying a cashier. The start time is the time from which the cashier having the cashier card is permitted to operate the ECR. The end time is the time when the operation of the ECR by the cashier is inhibited. The name is the cashier's name.

FIG. 7 shows examples of the operation of entering a cashier's password number FIG. 8 is a diagram showing an example of a receipt which is issued by the ECR at the sale of a commodity.

Figure 1:
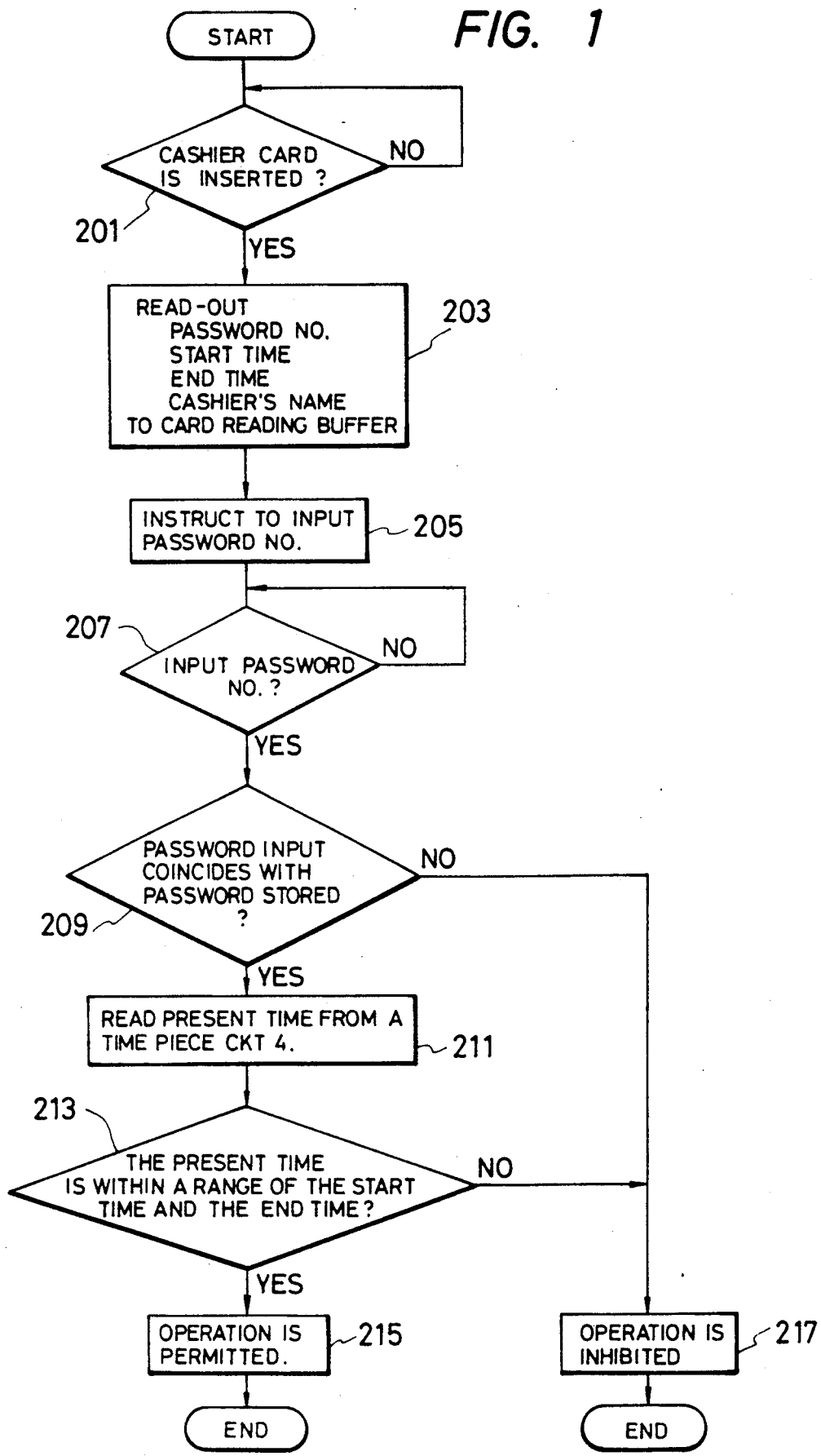
FIGS. 1 and 2 are flowcharts depicting the operation of an electronic cash register according to this invention.
Figure 2:
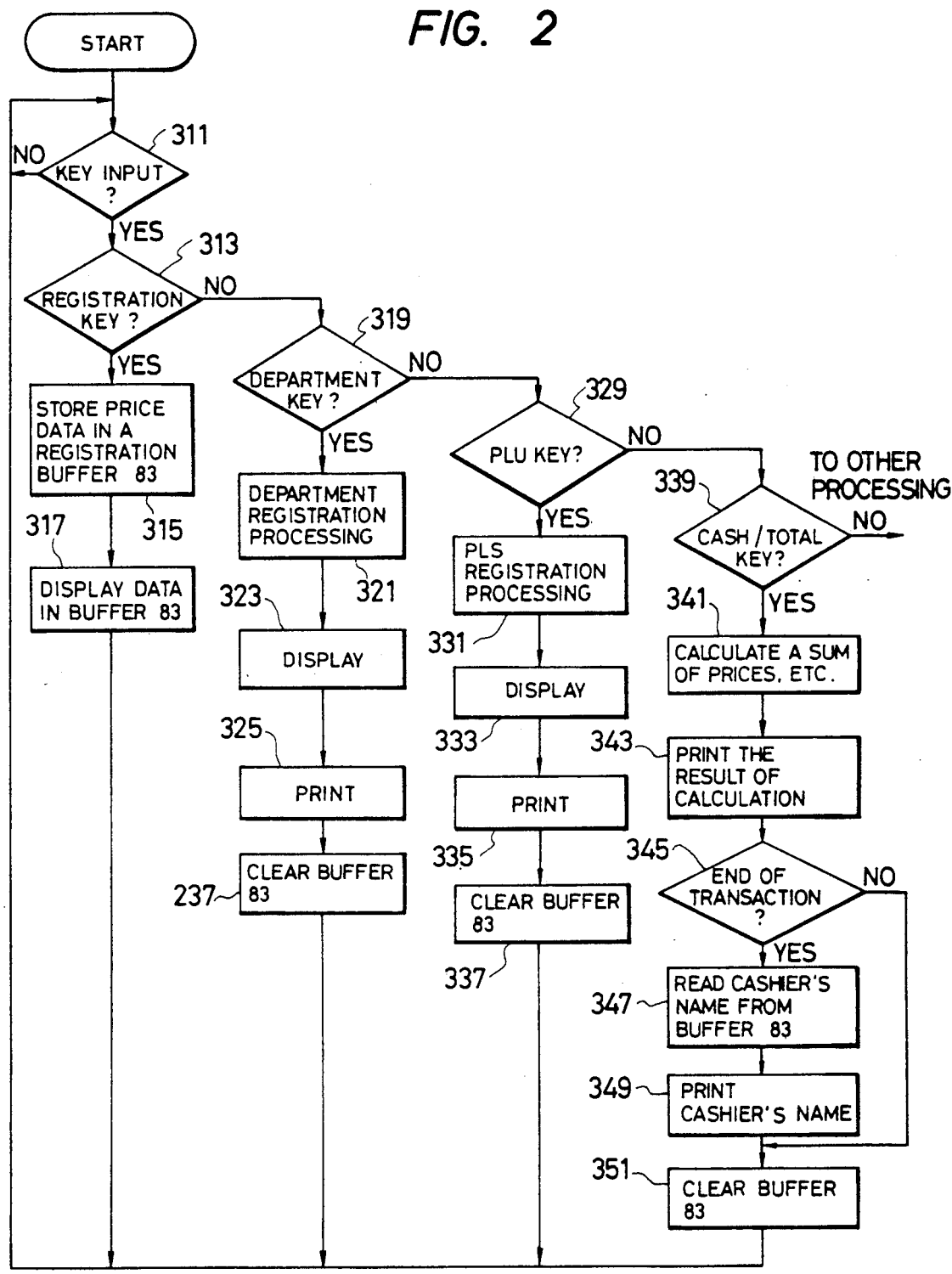

FIGS. 1 and 2 are flowcharts for a description of the operation of the ECR according to the invention. More specifically, the flowchart of FIG. 1 is for a cashier identification process, and that of FIG. 2 is for a transaction registration process.

The cashier identifying operation will now be described in detail with reference to FIGS. 1-7. The various program steps executed by CPU 1 are shown in FIGS. 1 and 2.

It is assumed that a cashier has a cashier card on which the data shown in FIG. 6 have been recorded. Recorded on the cashier card are the password number, e.g., "123456", the start time, e.g., "8:00 hours", the end time, e g., "15:00 hours", and the cashier's name, e.g., "J. Joker".

Before operating the ECR, the cashier inserts his cashier card into the cashier card inserting slot 21 shown in FIG. 4. Until then, the CPU 1 remains in step 201 of FIG. 1 awaiting card entry. Thereupon, the card reader 2 reads the card data in step 203 from the cashier card thus inserted. The CPU 1 also operates in step 203 to store the card data thus read in the card reading buffer 82. In the electronic cash register of the invention, unlike conventional ECRs, data on a cashier such as a confidential pasward number have not been stored in advance, and instead they are stored whenever a cashier card is inserted into the slot. Therefore, the storage capacity of the electronic cash register of the invention can be reduced accordingly.

After the card data has been stored in the card reading buffer 82, the CPU 1 operates in step 205 to display an instruction on the display unit 5 that the cashier should enter his password number. In response to this instruction displayed, the cashier enters his password number by operating the ten-key key pad 33. Thereupon, the CPU 1 detects this in step 207 and compares in step 209 the password number thus entered with the password number which has been stored in the card reading buffer 82. If the password number is entered by operating the ten keys as shown in FIG. 7(a), then the entered password number does not correspond with, e.g., coincide with that which has been stored in the card reading buffer, and therefore the CPU 1 proceeds to step 217 and conducts the processing required for inhibiting the cashier from operating the electronic cash register. If, on the other hand, the entered password number is as indicated by FIG. 7(b), then the entered password number corresponds with, e.g., coincides with, that which has been stored in the card reading buffer, and therefore CPU 1 proceeds to step 211. As is apparent from the above description, even if the cashier card is stolen by someone, the ECR cannot be operated with the card as long as the password number is unknown, because the entered password number is compared with that stored. Thus, the ECR is protected from being operated dishonestly.

Upon detecting the predetermined correspondence, e.g., coincidence, of the password number, in step 209, the CPU 1 reads the present time from the time piece circuit 4 in step 211, and, according to the start time and the end time stored in the card reading buffer 82, determines in step 213 whether or not the present time is within the ECR operable period of time. If the present time is 7:00 hours or 16:30 hours for instance, that is, it is not within the operable period of time, then the operation of the ECR by the cashier is inhibited by CPU proceeding to inhibitation step 217. If the present time is, for instance, 10:50 hours or 13:30 hours, that is, it is within the operable period of time, then the CPU 1 proceeds to step 215 where the operation of the ECR by the cashier is permitted.

With such an ECR of the invention, the period of time for which the ECR can be operated is strictly determined as was described above. This can prevent a cashier from fraudulently operating the ECR, and is effective in clarifying the working hours not only for the store but also the cashier, thus improving the control of the store.

The sale registration processing of the ECR will be described with reference to FIGS. 2-8.

First, the cashier operates the ten-key key pad 33 to enter the price of a commodity which a customer wants to buy. The CPU 1 determines in step 311 if there is a key input and then proceeds to step 313 where it determines if a registration key (one of the keys of the ten-key key pad 33) is operated. If not, the CPU 1 proceeds to step 319 where it determines if one of the department keys 33 which concerns the commodit has been depressed. If no department key has been depressed for the commodity, then the cashier enters the PLU code of the commodity and the CPU 1 proceeds to step 329 where it determines if the PLU key has been operated After completing the above-described entering operation for all of the commodities which the customer wants to buy, the cashier depresses the cash/total key 39 for totalization, and the CPU 1 determines the depression of this key in step 339.

When the price data of the commodity is entered as described above, the CPU 1 determines this in step 313 and then operates to store the price data in the registration buffer 83 in step 315 and to display it on the display unit 5 in step 317. The CPU 1 then returns to step 311 where it is reads for the next entry. When a registration key is not depressed (step 313) but one of the department keys 32 is depressed, the department registration processing is carried out beginning in step 321. In the department registration processing, the CPU 1 resets a transaction counter and a summation counter for the department. In succession, the CPU 1 then operates to display the department name on the display unit 5 in step 323, and to cause the printer 6 to print the department name and the price data on a receipt in step 325, and clears the registration buffer 83 in step 327. Then, the CPU 1 returns to an initial state again (step 311).

When a registration key is not operated (step 311) and a department key is not operated (step 319), but a PLU code is entered, the PLU registration processing is conducted by the CPU 1 beginning with step 331. In the PLU registration processing, the CPU 1 resets the transaction counter and the summation counter for the PLU code in step 331. Thereafter, in step 333, the CPU 1 operates to display the PLU code on the display unit 5 and proceeds to step 335 to cause the printer 6 to print the PLu code and the price data on a receipt. The CPU 1 then clears the registration buffer 83 in step 337. Then, the CPU 1 returns in an initial state again (step 311).

In response to the depression of the cash/total key 39 by the cahier, the CPU 1 following step 339, calculates in step 341 the sum of the prices of the commodities which the customer wants to purchase, the tax, etc. The results of the calculation are then printed on the receipt in step 345. If the transaction has not ended yet, as determined in step 345, then the CPU 1, after resetting the registration buffer 83 in step 351, returns to the initial state (step 311). When the transaction has ended, as determined by CPU 1 in step 345, the CPU 1 reads the name of the cashier out of the card reading buffer 82 in step 347 and causes the printer to print it on the receipt in step 349. Thereafter, the CPU 1 resets the registration buffer in step 351 and returns to the initial state (step 311).

As is apparent from the above description, an ECR constructed according to the invention determines whether or not the present time read from a time piece circuit is within the operable period of time read from a cashier card, so that the operation of the ECR is permitted only when the present time is within the operable period of time. In addition to this protection operation, the ECR according to the present invention is further provided with a function which determines whether or not the password number read from the cashier card corresponds to, e.g., coincides with, the password number entered by the cashier, so that the operation of the ECR is permitted only when the two password numbers correespond with each other. Therefore, even if the cashier card is stolen, the chance of dishonestly operating the ECR is reduced. In addition, greater control can be exercised over the cashier according to the invention.

Furthermore, in the ECR of the invention, unlike the conventional ECR, the data of the cashier are not stored, with the result that the storage capacity of the ECR can be reduced as compared with that of a conventional ECR.

Although an exemplary embodiment of the invention has been shown and described, it should be apparent that many modifications can be made without departing from the spirit and scope of the invention. For example, although the invention has been described as operating on a coincidence between an entered password and a card-stored password, it should be apparent that there only need be a defined correspondence between the entered and card-read password. Accordingly, the invention is not limited by the foregoing description, but is only limited by the scope of the appended claims.

What is claimed is:

1. An electronic cash register which an operator can operate by using a card on which at least a first password number and an operable period of time for which said register is operable have been recorded, comprising:

reading means for reading data from said card;
time indicating means for indicating the present time;
time determining means for determining whether or not the time indicated by said time indicating means is within said operable period of time read by said reading means;
means for entering a second password number;
means for determining whether or not said first password number read by said reading means has a predetermined correspondence with said second password number entered by said entering means; and
operation control means permitting said operator to operate said electronic cash register only when said determining means has determined that said first password number read by said reading means has said predetermined correspondence with said second password number read from said card by said reading means and said time determining means has determined the time indicated by said time indicating means is within said operable period of time read from said card by said reading means.

2. An electronic cash register as defined in claim 1, wherein said card further contains data identifying a cashier and said register further comprises means for storing said cashier identifying data, which is read from said card by said reading means.

3. An electronic cash register as defined in claim 2, further comprising means for processing a sales transaction, means for printing data concerning a processed sales transaction on a receipt, and means for causing said printing means to print said cashier identifying data on said receipt with said data concerning a processed sales transaction upon the completion of said sales transaction.

4. An electronic cash register as defined in claim 2, wherein said cashier identifying data is data representing a cashier's name.

5. An electronic cash register as defined in claim 3, further comprising a display and means responsive to the reading of data from said card for causing a message to be displayed on said display instructing an operator to enter a password number.

6. An electronic cash register as in claim 1, wherein said predetermined correspondence is a coincidence.

7. An electronic cash register as defined in claim 1, wherein said means for entering is a keyboard.

* * * * *